(12) United States Patent
Ang et al.

(10) Patent No.: US 7,894,107 B2
(45) Date of Patent: Feb. 22, 2011

(54) OPTICAL SCANNER WITH NON-REDUNDANT OVERWRITING

(75) Inventors: Anthony Ang, Long Beach, CA (US); Robert Paul Loce, Webster, NY (US); Beilei Xu, Penfield, NY (US); Robert Kleckner, Pittsford, NY (US)

(73) Assignee: Xerox Corporation, Norwalk, CT (US)

( * ) Notice: Subject to any disclaimer, the term of this patent is extended or adjusted under 35 U.S.C. 154(b) by 970 days.

(21) Appl. No.: 11/796,397

(22) Filed: Apr. 27, 2007

(65) Prior Publication Data

US 2008/0266619 A1 Oct. 30, 2008

(51) Int. Cl.
H04N 1/04 (2006.01)
(52) U.S. Cl. .................. 358/481; 358/448; 358/462; 358/486; 358/475
(58) Field of Classification Search .................. 358/481, 358/462, 486, 475
See application file for complete search history.

(56) References Cited

U.S. PATENT DOCUMENTS

| 5,638,107 | A | 6/1997 | Curry et al. |
| 5,729,663 | A | 3/1998 | Lin |
| 5,732,162 | A | 3/1998 | Curry et al. |
| 5,748,223 | A * | 5/1998 | Ito .............................. 347/241 |
| 6,519,055 | B1 | 2/2003 | Curry et al. |
| 7,164,515 | B2 | 1/2007 | Ito |

FOREIGN PATENT DOCUMENTS

JP 3237452 12/2001

* cited by examiner

*Primary Examiner*—Houshang Safaipour
(74) *Attorney, Agent, or Firm*—Fay Sharpe LLP

(57) ABSTRACT

An optical scanning device is provided which comprises a laser array which emits laser beams including a number of beams $(1, 2, \ldots, n)$ writing a swath of rasters having a laser scanning section which, when an interlaced scanning period i, is set to a natural number between beams which are adjacent in a sub-scanning direction, scans the laser beams emitted from the laser array with the interlaced scanning period i. The laser scanning section can scan the laser beams such that the beam number n and the interlaced scanning period i are relatively prime natural numbers, and $n > i$. In a first scan, data for raster lines $(1, 2, \ldots, n)$ can be selectively associated with a respective first exposure. At a second scan, data for raster lines $(i+1, i+2, \ldots, n)$ can be selectively associated with a respective second exposure and data for raster lines $(n+1, n+2, \ldots, n+i)$ can be selectively associated with a respective first exposure. The first respective exposure for raster lines $(i+1, i+2, \ldots, n)$ is not equal to the respective second exposure for raster lines $(i+1, i+2, \ldots, n)$.

13 Claims, 5 Drawing Sheets

OPTICAL SCANNER WITH NON-REDUNDANT OVERWRITING

BACKGROUND

The present disclosure relates to an optical scanning device, and particularly relates to an optical scanning device which is employed in a digital copier, a laser beam printer or the like and which carries out simultaneous writing with a plurality of laser beams. In order to reduce banding in prints produced by a raster output scanner (ROS) with multiple beams, it is often necessary to overwrite the exposed profile to average out nonuniformity caused by xerographic nonlinearities and beam power nonuniformity and misalignment. However, overwriting can waste ROS optomechanical bandwidth and driver bandwidth that could be used for applications such as increased image quality, electronic registration and microprinting. It is highly desirable to utilize this ROS bandwidth thereby enabling these applications.

Conventional overwriting presents a significant bandwidth challenge to the ROS while not fully utilizing that bandwidth, for example, the image path provides no more information bits to a ROS that is overwriting even though it is operating at twice the bandwidth. It is desirable to reap as many benefits as possible from a high bandwidth, overwriting ROS.

SUMMARY OF THE DISCLOSURE

In one aspect of the present disclosure, an optical scanning device is provided which comprises a laser array which emits laser beams including a number of beams $(1, 2, \ldots,)$ writing a swath of rasters having a laser scanning section which, when an interlaced scanning period i, is set to a natural number between beams which are adjacent in a sub-scanning direction, scans the laser beams emitted from the laser array with the interlaced scanning period i. The laser scanning section can scan the laser beams such that the beam number n and the interlaced scanning period i are relatively prime natural numbers, and n>i. In a first scan, data for raster lines $(1, 2, \ldots, n)$ can be selectively associated with a respective first exposure. In a second scan, data for raster lines $(i+1, i+2, \ldots n)$ can be selectively associated with a respective second exposure and data for raster lines $(n+1, n+2, \ldots, n+i)$ can be selectively associated with a respective first exposure. The respective first exposure for raster lines $(i+1, i+2, \ldots n)$ is not equal to the respective second exposure for raster lines $(i+1, i+2, \ldots n)$.

In another aspect, an optical scanning device is provided and comprises a laser array which emits laser beams including a number of beams $(1, 2, \ldots, n)$ writing a swath of rasters having a laser scanning section which, when an interlaced scanning period i, is set to a natural number between beams which are adjacent in a sub-scanning direction, scans the laser beams emitted from the laser array with the interlaced scanning period i. The laser scanning section can scan the laser beams such that the beam number n and the interlaced scanning period i are relatively prime natural numbers, and n>i. In a first scan, data for raster lines $(1, 2, \ldots, i)$ can be selectively associated with a respective first laser power exposure of either zero or power $P_1$ $[0, P_1]$ and data for raster lines $(i+1, i+2, \ldots n)$ can be selectively associated with a respective second laser power exposure $[0, P_2]$. In a second scan, data for raster lines $(i+1, i+2, \ldots, n)$ can be selectively associated with a respective first laser power exposure $[0, P_1]$ and data for raster lines $(n+1, n+2, \ldots, n+i)$ can be selectively associated with a respective second laser power exposure $[0, P_2]$. The raster lines $(i+1, i+2, \ldots, n)$ can be selectively associated with a laser power exposure selected from the group consisting of $0, P_1, P_2$, and $(P_1+P_2)$ after the first scan and the second scan.

In still another aspect, an electronic registration method in association with an optical scanner is provided which comprises inputting data from an electronic image path to a raster output scanner (ROS) wherein the ROS can be a multi beam scanner and the data is a first binary representation of pixel values. The method further includes driving the raster output scanner in a first scan to write image signals based on the data wherein the signals include a swath of raster lines producing spatial regions having a first exposure. The method further provides for driving the ROS in a second scan and providing non-redundant data by the image path to overwrite one or more of the previously written image signals.

DETAILED DESCRIPTION

Figure 1:
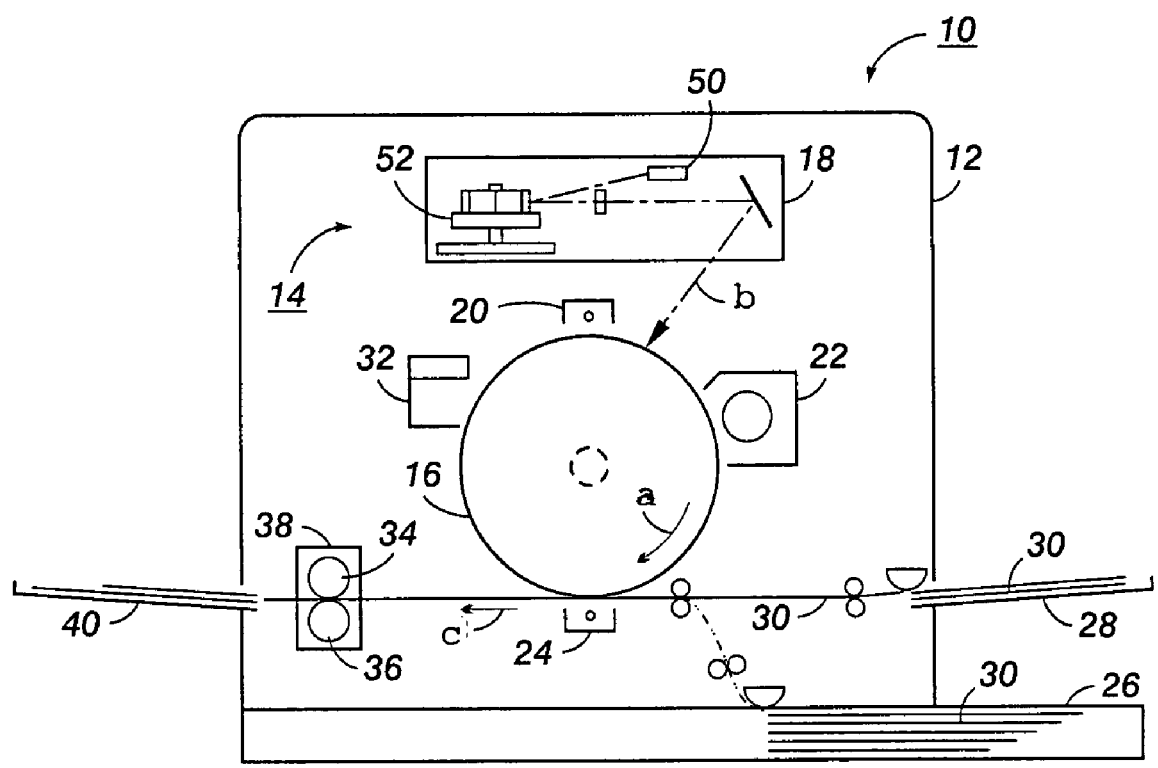
FIG. 1 is a diagram showing schematic structure of an image-forming apparatus relating to an embodiment of the present disclosure.

FIG. 1 is a diagram showing general structure of an image-forming apparatus 10 relating to an embodiment of the present disclosure. The image-forming apparatus 10 is covered by a casing 12.

An image-forming section 14 is provided inside the casing 12. The image-forming section 14 is provided with a cylindrical photoreceptor 16 and an optical scanning device 18. The photoreceptor 16 rotates at a constant speed in the direction of an arrow a shown in FIG. 1. The optical scanning device 18 directs light beams based on desired image data toward the photoreceptor 16 (in the direction of an arrow b in FIG. 1) while scanning.

A charging unit 20 is disposed in a peripheral surface vicinity of the photoreceptor 16. The charging unit 20 charges the photoreceptor 16 uniformly as a result of the photoreceptor 16 rotating in the direction of arrow a at a predetermined speed. The rotation of the polygon mirror 52 causes beams b to scan along a path that is parallel to the axis of the photoreceptor 16. The intensities of the beams are modulated in an imagewise fashion as they are scanned, selectively discharging the photoreceptor 16 and thereby creating a latent image on the photoreceptor 16.

A developing unit 22 which supplies toner to the photoreceptor 16 is disposed facing the peripheral surface of the photoreceptor 16, at a downstream side in the direction of rotation of the photoreceptor 16 from a position of irradiation by the light beam or beams from the optical scanning device 18. The toner supplied from the developing unit 22 adheres at portions which have been irradiated by the light beam from the optical scanning device 18. As a result, a toner image is formed on the peripheral surface of the photoreceptor 16.

A transfer charger 24 is disposed facing the peripheral surface of the photoreceptor 16, at a downstream side of the photoreceptor 16 in the direction of rotation of the photoreceptor 16 from the position at which the developing unit 22 is disposed (at a position vertically below an axial center of the photoreceptor 16). The transfer charger 24 transfers the toner image formed on the peripheral surface of the photoreceptor 16 to paper 30, which is guided between the photoreceptor 16 and the transfer charger 24 from a paper tray 26 or a manual feed tray 28.

A cleaner 32 is disposed facing the photoreceptor 16, at a downstream side in the rotation direction of the photoreceptor 16 from the position at which the transfer charger 24 is disposed. Toner remaining at the peripheral surface of the photoreceptor 16 after transfer is removed by the cleaner 32.

The paper 30 to which the toner image has been transferred is ejected in the direction of an arrow c. A fixing unit 38, which is structured to include a pressure roller 34 and a heating roller 36, is disposed at a downstream side from the photoreceptor 16 in the direction of ejection of the paper 30. At the fixing unit 38, the paper 30 to which the toner image has been transferred and which is being ejected is subjected to pressure and heated, and the toner is fixed by melting. That is, a "fixing process" is performed at the fixing unit 38, and the predetermined image is recorded on the paper 30. The fixing process is achieved, and the paper 30 on which the image has been recorded is ejected to a discharge tray 40.

In one exemplary embodiment to practice, the optical scanning device 18 can be provided with an array-form semiconductor laser (below referred to as a "laser array") and a polygon mirror (a rotating multi-faced mirror). The polygon mirror can be formed in a regular polygonal shape and provided with a plurality of reflection surfaces at side faces thereof, and can be rotated at high speed by an unillustrated motor. The laser array can be a vertical cavity surface emitting laser (VCSEL) in which a plurality of light emitting spots are arranged in two dimensions.

The VCSEL can include a multi-spot laser diode in which the plurality of light emitting spots are arranged in two dimensions. In one arrangement, the multi-spot laser diode can have a total of thirty-six light emitting spots disposed two-dimensionally with predetermined spacings, six in a main scanning direction by six in a sub-scanning direction. In another arrangement, the multi-spot laser diode can have a total of thirty-two light emitting spots disposed two-dimensionally with predetermined spacings, eight in one scanning direction by four in another scanning direction. These exemplary arrangements are for illustration purposes and are not intended to be limiting of the disclosure. Other optical scanner reductions to practice are well known to those skilled in the art. For example, the light emitting device 50 can be a single edge emitting laser diode having a multiplicity of emitters on a single chip, or a multiplicity of diodes. The scanning function, shown implemented by a rotating polygon mirror 52, could also be implemented by an oscillating galvanometer or a micro-electro-mechanical system.

Figure 2:
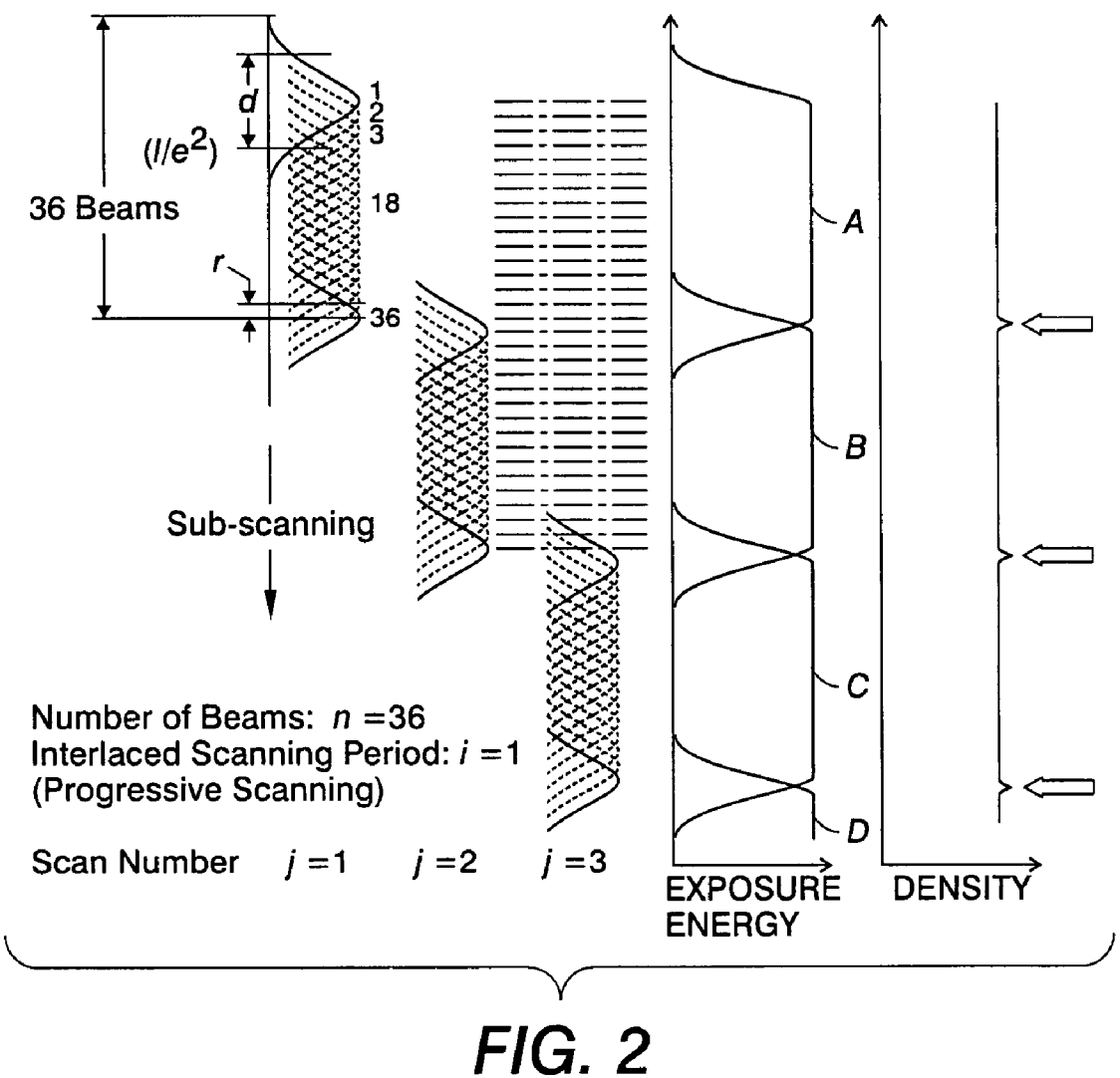
FIG. 2 is a diagram showing exposure profiles formed in a sub-scanning direction by laser beams on a scanning surface, in a case of scanning for writing using a conventional optical scanning device.

FIG. 2 is a diagram showing an exposure profile which is formed in the sub-scanning direction by the laser beams on the scanning surface in a case of scanning writing using this optical scanning device. Here, a number of laser beams n=36, and a case of progressive scanning is shown. That is, neighboring beams are scanned along respectively neighboring scanning lines of a raster image.

The optical scanning device carries out simultaneous scanning of 1st to 36th scanning lines using a 1st laser beam to a 36th laser beam at a time of a 1 st cycle of scanning of the beams (represented by a scan number (j=1) in the drawing). Then the optical scanning device carries out simultaneous scanning of 37th to 72nd scanning lines with the laser beams for scan number (j=2). Thereafter, scanning of blocks of 36 lines in order of scan numbers (j=3), (j=4), . . . is similarly sequentially carried out in the same manner.

Figure 3:
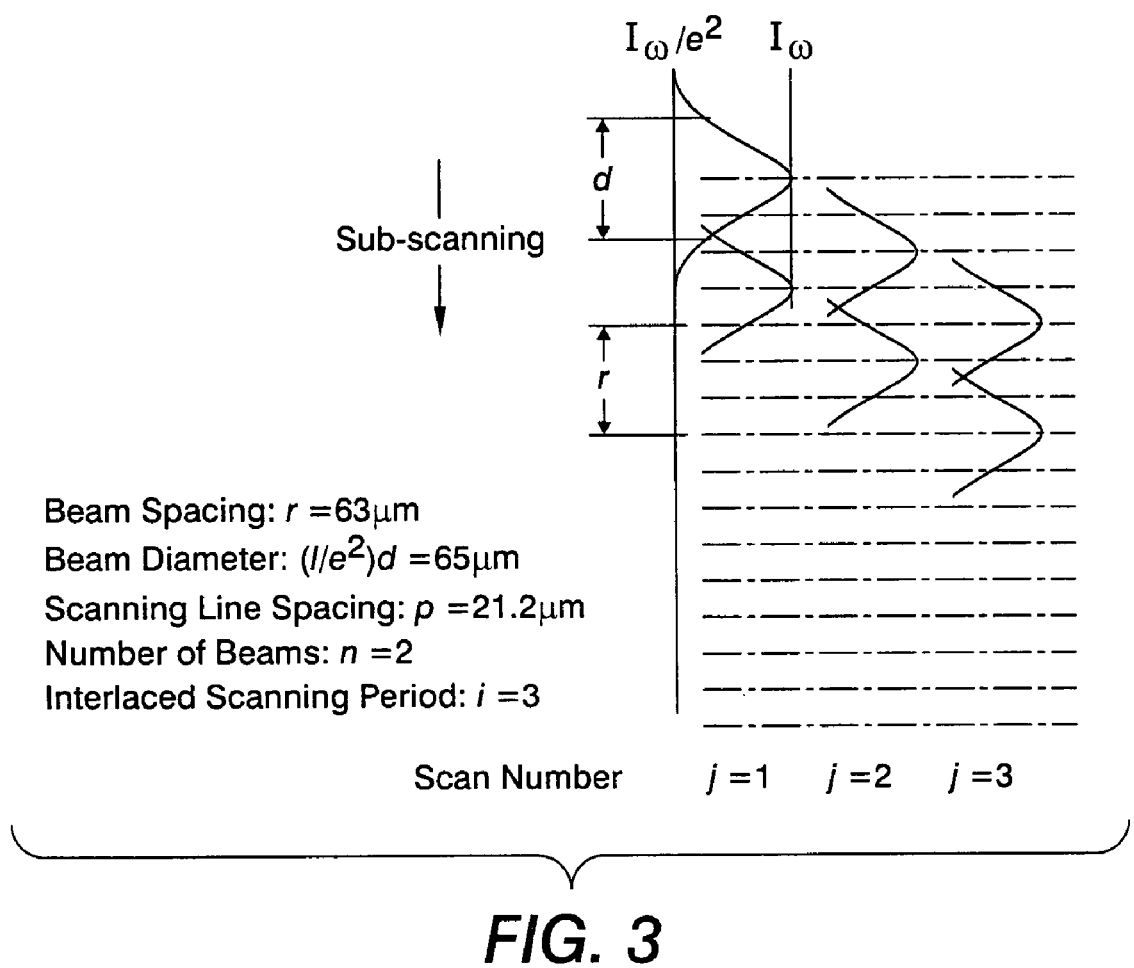
FIG. 3 is a diagram describing a conventional technique for writing by interlaced scanning.

FIG. 3 is a diagram describing a conventional technique for writing with interlaced scanning. This technique is described in, for example, Japanese Patent No. 3,237,452. Herein, a natural number i (greater than or equal to 2), which has a spacing r between two neighboring beams divided by a scanning line spacing p, is defined as an "interlaced scanning period". Note that i=1 for progressive scanning.

For example, if the scanning period i=(r/p)=3, that is, if the spacing 7' between two beams is specified to be 3p (p being the scanning line spacing), then for the scan number (j=1), a 1st scanning line is formed by a 1 st laser beam and a 4th scanning line is formed by a 2nd laser beam. Then, when the scan number (j=2), a 3rd scanning line is formed by the 1 st laser beam and a 6th scanning line is formed by the 2nd laser beam. In the same way, for scan number (j=3) and onward, 5th, 7th, 9th, . . . scanning lines are formed by the first laser beam and 8th, 10th, 12th, . . . scanning lines are synchronously formed by the second laser beam.

Note that when interlaced scanning is carried out by a multi-beam exposure device as described above, it is sufficient that the number n of laser beams and the interlaced scanning period i are relatively prime natural numbers. That is, the number of laser beams n and the interlaced scanning period i are not divisible by a common integer other than 1.

Thus, if an interlaced scanning period defined by a natural number i (greater than or equal to 2), which is a quotient when a spacing r between adjacent beams on the scanned surface is divided by the scanning line spacings, is set to i, then, to prevent the problem of image defects due to reciprocity law failures it is necessary to carry out interlaced scanning in a case such that n and p satisfy the following equation: $[1/n*p]$ is less than or equal to 3 cycle/mm.

It is to be appreciated that the number of lasers n and the interlaced scanning period i can be set up such that when the number of lasers n is 16 or 32, interlaced scanning can be set up with i=3, 5, 7, 9, 11, 13, 15, 17, 19 . . . , wherein a relationship between the number of beams n and the interlaced scanning period i satisfy the condition i<n.

Figure 4:
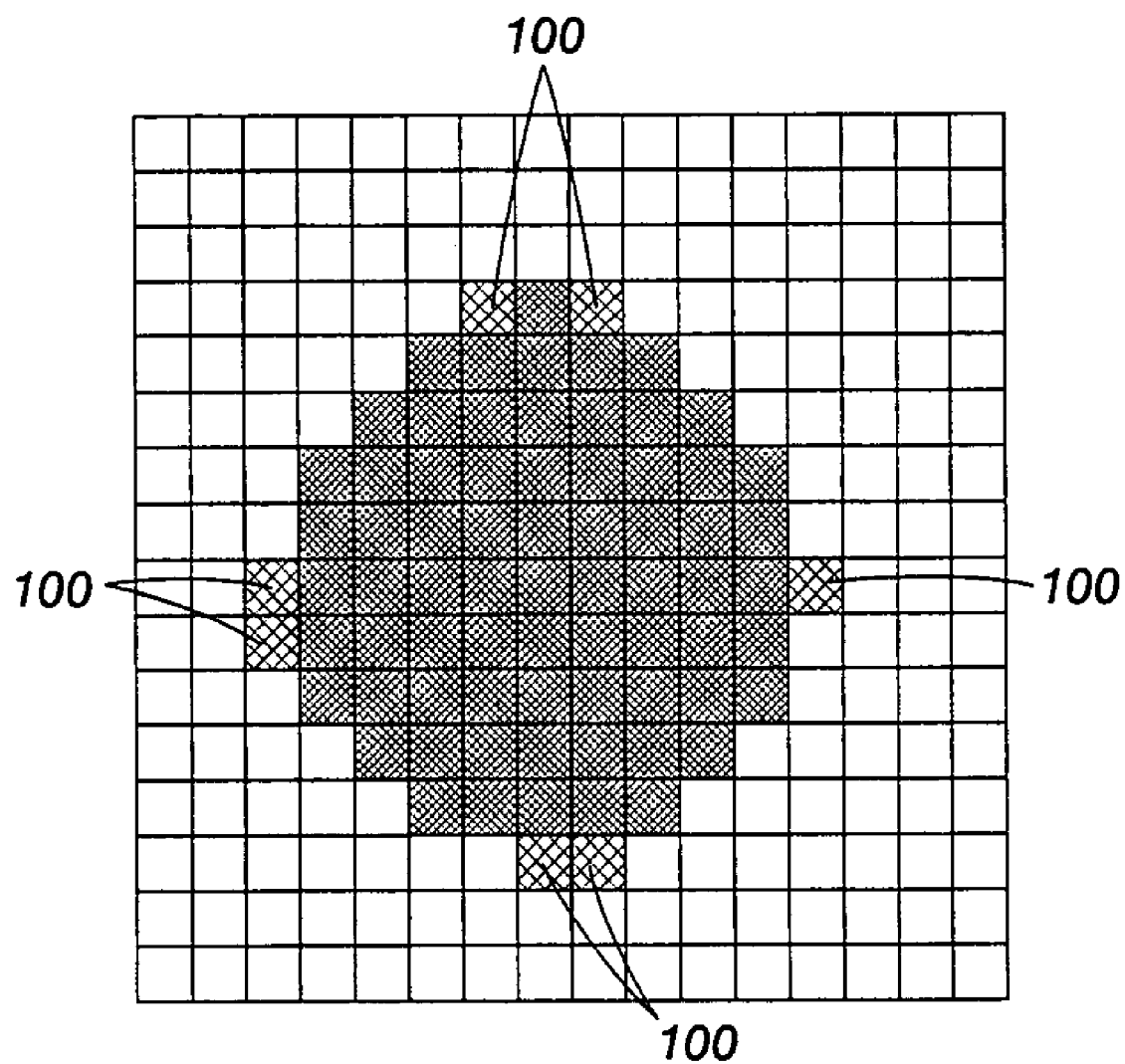
FIG. 4 is a schematic example of a halftone dot image written with extra levels around the periphery to produce finer gray steps in a threshold reproduction curve (TRC); and, FIG. 5 is a diagram showing an electronic registration example using non-redundant overwriting.
Figure 5:
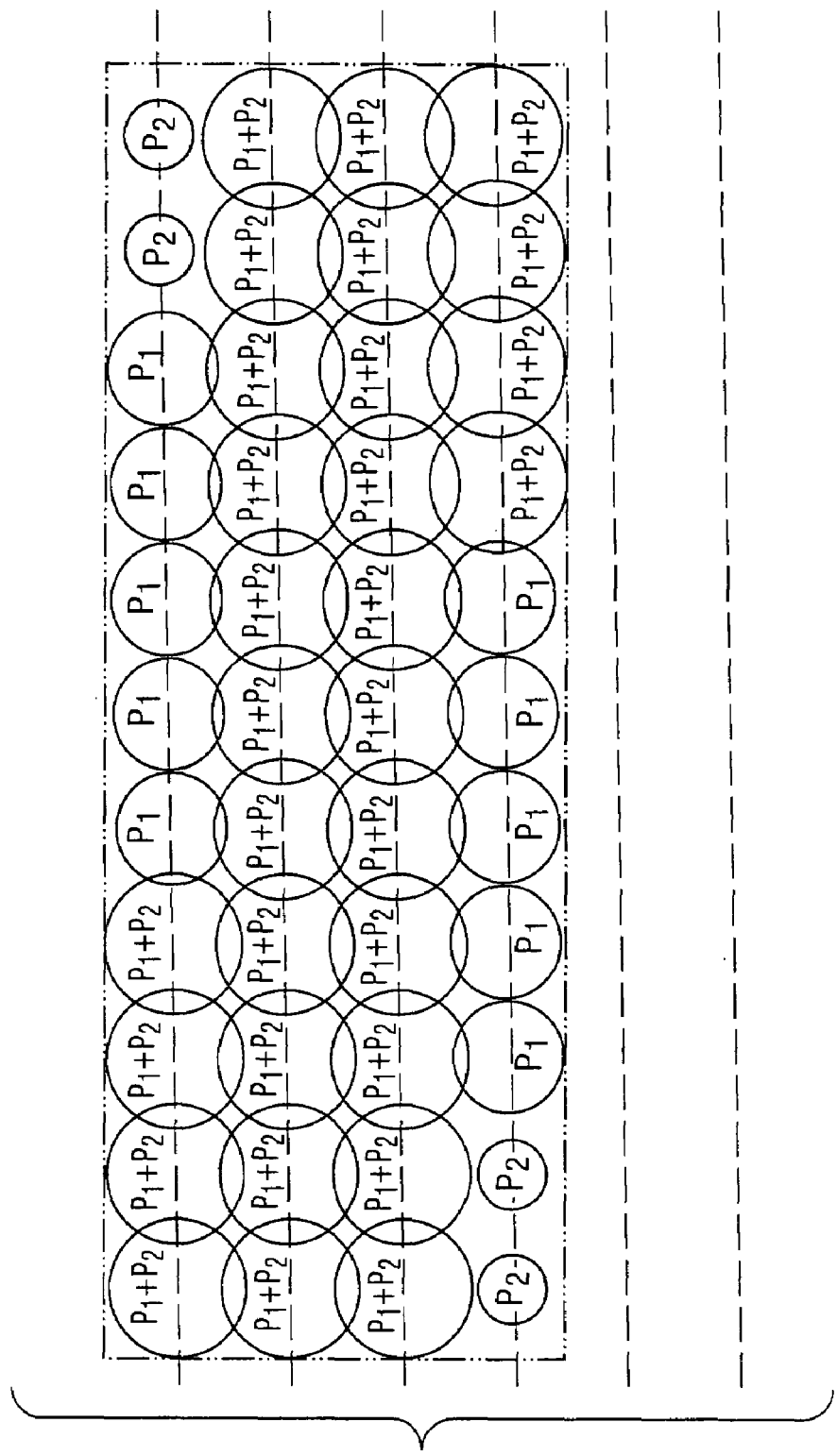

Embodiments of the present disclosure will be described in detail with reference to FIGS. 4 and 5. The present disclosure provides an imager/image path architecture that enables non-redundant overwriting. That is, a second exposure that is overwriting some number of rasters can be different than a first exposure. The imager provides the overwriting, while the image path provides the data for non-redundant writing. There can be at least two options in the non-redundant overwriting. Option (1) provides consistent power yielding three exposure levels for a 2-pass system: 0 on, 1 on, or 2 on. This is analogous to 3-level amplitude modulation, only without the laser power actually being modulated at different levels. Option (2) provides different laser power which can be used in subsequent passes ($P_1$, $P_2$) yielding 4 levels for a 2-pass system: $[0, P_1, P_2, P_1+P_2]$. Non-redundant overwriting provides some interlaces that cannot be achieved by simply increasing the raster resolution. Most applications, benefits, and features that could be enabled by high addressability are enabled by the present disclosure. One application includes electronic registration because it uses high bandwidth in the image path at the very last stage prior to driving the ROS. The present disclosure can be utilized at the VCSEL ROS.

In one exemplary arrangement, a printing system can utilize a laser scanner as a ROS and can nominally write at 2400 spi (spots per inch). The description that follows for this exemplary arrangement is for illustration purposes and is not intended to be limiting of the disclosure.

The present disclosure provides for an apparatus and a method. The general method can utilize several steps, to be described hereinafter. Data from an electronic image path can be input to a ROS. The common form of data presented to the ROS is a binary [0, 1] representation of pixel values, but image data at other quantization are within the scope of the present invention. The data may be stored in a scan line buffer or scan line buffers and read out in a manner clocked with ROS writing timing.

The data drives the ROS to write image signals such as a swath of raster lines as produced by a multi-beam ROS. The data drive the ROS to produce spatial regions having a first exposure. A typical scenario would be the writing of a swath of beams in a multiple beam ROS, such as, for example, a 32 beam VCSEL ROS. The beams can be spaced for the interlace and magnification dictated by given design parameters. For instance, the beams can be spaced at 2400 spi for writing with an interlace of 1.

Non-redundant data can be provided by the image path to drive the ROS to overwrite at least some of the previously imaged signals. Additional data is provided to the ROS from the image path to overwrite one or more of the previously written raster lines. One aspect of the present disclosure provides for additional data that can be different than the previously supplied data. In the case of a binary example, when overwriting a raster line, the data of the second writing may be 0 at a location where the data of the first writing was 1, or vice versa.

In one exemplary arrangement, in a first scan, data for raster lines 1 to 32 can be supplied to a 32 beam VCSEL ROS that writes a swath of 32 rasters at 2400 raster/inch to produce a respective first exposure for raster lines 1 to 32. The data can be binary thereby producing spatial regions associated with "on" states and "off" states.

In a second scan, data for raster lines 17 to 48 can be supplied to the VCSEL ROS. The image plane is moved relative to the ROS so that the lower 16 rasters of the first swath (17 to 32) receive a respective second exposure and rasters 33 to 48 receive a respective first exposure. Data for the respective second exposure of rasters 17 to 32 may be different that data for the respective first exposure of rasters 17 to 32.

In a third scan, data for raster lines 33 to 64 can be supplied to the VCSEL ROS. The image plane is moved relative to the ROS so that the lower 16 rasters of the first swath (33 to 48) receive a respective second exposure and rasters 49 to 64 receive a respective first exposure. Data for the respective second exposure of rasters 33 to 48 may be different that data for the respective first exposure of rasters 33 to 48.

The present disclosure provides an optical scanning device which can comprise a laser array which emits laser beams including a number of beams $(1, 2, \ldots, n)$ writing a swath of rasters having a laser scanning section which, when an interlaced scanning period i, is set to a natural number between beams which are adjacent in a sub-scanning direction, scans the laser beams emitted from the laser array with the interlaced scanning period i. The laser scanning section can scan the laser beams such that the beam number n and the interlaced scanning period i are relatively prime natural numbers, and n>i. In a first scan, data for raster lines $(1, 2, \ldots, n)$ can be selectively associated with a respective first exposure and wherein at a second scan, data for raster lines $(i+1, i+2, \ldots, i)$ can be selectively associated with a respective second exposure and data for raster lines $(n+1, n+2, \ldots n+i)$ can be selectively associated with a respective first exposure. The first exposure for raster lines $(i+1, i+2, \ldots, n)$ is not equal to the respective second exposure for raster lines $(i+1, i+2, \ldots, n)$. And wherein at a third scan, data for raster lines $(n+1, n+2, \ldots, n+i)$ can receive a respective second exposure and data for raster lines $(n+i+1, n+i+2, \ldots, n+n)$ can receive a respective first exposure. The optical scanning device can comprise data that is a binary representation of pixel values thereby producing spatial regions associated with an on state and an off state.

In another exemplary embodiment, a ROS can be driven to write a halftone dot with gray edges for more levels and driver robustness. When overwriting is employed the laser driver can be required to modulate at 2× the speed of a ROS that does not employ overwriting. Hence the driver may fail to deliver the required modulation at the high speeds. A single pixel on or off may fail to form due the unusual high speeds incurred when overwriting.

To get around this potential driver problem while obtaining benefits of a multi-level halftoning system, the edge pixels can be turned on or off with 2 or more in a row in a raster line and have the second pass (layer) employ pixels in the opposite state. This will allow formation of halftone dots 100 with finely controlled incremental gray level step sizes so that smooth transitions can be achieved in the gray level of the halftone dot. An example of a halftone dot written with extra levels around the periphery is shown in FIG. 4. Similar gray edge (1-layer) writing could be used to finely position edges of other image structures, such as line art.

In still another exemplary arrangement, a ROS can be driven to write a higher number of gray levels at any pixel. For example, assume a first exposure to a spatial region could be one of $[0, P_1]$ and second exposure to that region could be one of $[0, P_2]$, where the P's denote the laser power used for that region. A given region could then receive a combined exposure of either $0, P_1, P_2,$ or $P_1+P_2$. Hence, if $P_1$ does not equal $P_2$ a 4-level system can be enabled from two binary sets of data.

If $2P_1$ is approximately equal to $P_2$ and $P_1+P_2$ equals 1 (full exposure), then $[0, P_1, P_2,$ or $P_1+P_2]$ equals $[0, ⅓, ⅔, 1]$ and the system possesses equal steps of quantization.

A simple method of enabling additional levels can be understood by using the 32 beam system, wherein 16 beams of the swath, say the first 16, can be written with $[0, P_1]$ and the other 16 beams can be written with $[0, P_2]$. Other 2-power exposure schemes are also possible. This method can be generalized to a $2^n$ exposure scheme for $17$ levels of overwriting. For example, a 3-level power exposure scheme (n=3) would result in 8 possible exposures for a given region [i.e. 0, $P_1, P_2, P_3, P_1+P_2, P_1+P_3, P_2+P_3, P_1+P_2+P_3$].

The optical scanning device provides a laser array which emits laser beams including a number of beams $(1, 2, \ldots, n)$ writing a swath of rasters having a laser scanning section which, when an interlaced scanning period i, is set to a natural number between beams which are adjacent in a sub-scanning direction, scans the laser beams emitted from the laser array with the interlaced scanning period i. The laser scanning section can scan the laser beams such that the beam number n and the interlaced scanning period i are relatively prime natural numbers, and n>i. In a first scan, data for raster lines $(1, 2, \ldots, i)$ can be selectively associated with a respective first laser power exposure of $[0, P_1]$ and data for raster lines $(i+1, i+2, \ldots n)$ can be selectively associated with a respective second laser power exposure $[0, P_2]$. In a second scan, data for raster lines $(i+1, i+2, \ldots, n)$ can be selectively associated with a respective first laser power exposure $[0, P_1]$ and data for raster lines $(n+1, n+2, \ldots, n+i)$ can be selectively associated with a respective second laser power exposure $[0, P_2]$. The raster lines (i+1, i+2, ..., n) can be selectively associated with a laser power exposure selected from the group consisting of 0, $P_1$, $P_2$, and ($P_1+P_2$) after the first scan and the second scan. The optical scanning device can comprise a first laser power exposure $P_1$ and a second laser power exposure $P_2$, wherein the first laser power exposure is not equal to the second laser power exposure. The data can be a binary representation of pixel values thereby producing spatial regions selected from the group consisting of no exposure in either pass, exposure in one pass using power $P_1$, exposure in one pass using power $P_2$, and exposure in two passes using power [$P_1+P_2$]. In one arrangement, two times $P_1$ can be substantially equal to $P_2$. $P_1$ plus $P_2$ can equal full exposure. In another arrangement, $P_1$ is ⅓ of full exposure and $P_2$ is ⅔ of full exposure.

An electronic registration system, having multiple gray levels, can account for system distortion as will be described hereinafter. One objective is to write an object in a desired position, given that the rasters can be slanted due to a distortion such as skew or bow. Referring now to FIG. 5, wherein it is shown that an object is intended to be written with horizontal edges, but the raster are slanted due to some system distortion. FIG. 5 shows that the use of single writing (single layer) and overwriting with different laser powers to achieve desired edge positions. Other distortions (bow, skew, scan nonlinearity, magnification, displacement) could also be compensated using this method. This application does not require high bandwidth for the entirety of the image path. In one reduction to practice, the power and overwrite decisions can be made in an electronic registration module that is at the end of the image path, just prior to the ROS. The optical scanning device can include a selective power exposure which can be equal to 2 to the power of the (number of laser power levels). It is to be appreciated that if K passes of overwriting occurs, then a raster line can be overwritten K times in subsequent passes and each pass could use a common power level or a unique power level.

In some instances the benefits described above can be obtained by writing at a higher raster resolution versus non-redundant overwriting. For instance, writing at 4800 rasters/inch yields many of the advantages of overwriting with non-redundant data at 2400 rasters/inch. But, the overwriting scheme allows additional interlace schemes that are not obtainable at 4800 rasters/inch. Table 1 provides some examples that show that, for the same magnification and bandwidth, the overwriting scheme enables different interlace options for different numbers of beams compared to the 4800 spi case.

non-redundant data by the image path to overwrite one or more of the previously written image signals. The non-redundant data can be a second binary representation of pixel values different from the first binary representation of pixel values. The first and second binary representation of pixel values can produce spatial regions selected from the group consisting of no exposure in either scan, exposure in one scan using a first power, exposure in one scan using a second power, and exposure in two scans using both the first power and the second power. The exemplary embodiments have been described with reference to the specific embodiments. Obviously, modifications and alterations will occur to others upon reading and understanding the preceding detailed description. It is intended that the exemplary embodiments be construed as including all such modifications and alterations insofar as they come within the scope of the appended claims or the equivalents thereof.

What is claimed is:

1. An optical scanning device comprising: a laser array which emits laser beams including a number of beams (1, 2, ..., n) writing a swath of rasters having a laser scanning section which, when an interlaced scanning period i, is set to a natural number between beams which are adjacent in a sub-scanning direction, scans the laser beams emitted from the laser array with the interlaced scanning period i, the laser scanning section scans the laser beams such that the beam number n and the interlaced scanning period i are relatively prime natural numbers, and n>i;

wherein in a first scan, data for raster lines (1, 2, ..., n) are selectively associated with a respective first exposure;

at a second scan, data for raster lines (i+1, i+2, ... n) are selectively associated with a respective second exposure and data for raster lines (n+1, n+2, ..., n+i) are selectively associated with a respective first exposure; and, said respective first exposure for raster lines (i+1, i+2, ..., n) is not equal to said respective second exposure for raster lines (i+1, i+2, ..., n).

2. The optical scanning device of claim 1, wherein said data is a binary representation of pixel values thereby producing spatial regions associated with an on state and an off state.

3. The optical scanning device of claim 1, wherein at a third scan, data for raster lines (n+1, n+2, ..., n+i) are selectively associated with a respective second exposure and data for raster lines (n+i+1, n+i+2, ..., n+n) are selectively associated with a respective first exposure.

4. The optical scanning device of claim 3, wherein at said third scan said respective first exposure for raster lines (n+i+

TABLE 1

| Interlace | Overwrite | Resolution (rasters/inch) | Beam spacing (microns) | # of beams | | | | | | | | | |
|---|---|---|---|---|---|---|---|---|---|---|---|---|---|
| | | | | 2 | 3 | 4 | 5 | 6 | 7 | 8 | 30 | 31 | 32 |
| 1 | y | 2400 | 10.6 | x | | x | | x | | x | x | | x |
| 2 | n | 4800 | 10.6 | | x | | x | | x | | | x | |

The electronic registration method, in association with an optical scanner, provides inputting data from an electronic image path to a ROS wherein the ROS can be a multi-beam scanner and the data is a first binary representation of pixel values. The method further includes driving the raster output scanner in a first scan to write image signals based on the data wherein the signals include a swath of raster lines producing spatial regions having a first exposure. The method further provides for driving the ROS in a second scan and providing 1, n+i+2, ..., n+n) is not equal to said respective second exposure for raster lines (n+1, n+2, ..., n+i).

5. The optical scanning device of claim 4, wherein said data is a binary representation of pixel values thereby producing spatial regions associated with an on state and an off state.

6. An optical scanning device comprising: a laser array which emits laser beams including a number of beams (1, 2, ..., n) writing a swath of rasters having a laser scanning section which, when an interlaced scanning period i, is set to a natural number between beams which are adjacent in a sub-scanning direction, scans the laser beams emitted from the laser array with the interlaced scanning period i, the laser scanning section scans the laser beams such that the beam number n and the interlaced scanning period i are relatively prime natural numbers, and n>i;

in a first scan, data for raster lines (1, 2, . . . , i) are selectively associated with a respective first laser power exposure of zero and power level $P_1$ $[0, P_1]$ and data for raster lines (i+1, i+2, . . . , n) are selectively associated with a respective second laser power exposure $[0, P_2]$;

in a second scan, data for raster lines (i+1, i+2, . . . , n) are selectively associated with a respective first laser power exposure $[0, P_1]$ and data for raster lines (n+1, n+2, . . . , n+i) are selectively associated with a respective second laser power exposure $[0, P_2]$; and, said raster lines (i+1, i+2, . . . , n) selectively associated with a laser power exposure selected from the group consisting of 0, $P_1$, $P_2$, and $(P_1+P_2)$ after said first scan and said second scan.

7. The optical scanning device of claim 6, wherein said first laser power exposure $P_1$ is not equal to said second laser power exposure $P_2$.

8. The optical scanning device of claim 7, wherein said data is a binary representation of pixel values thereby producing spatial regions selected from the group consisting of no exposure in either pass, exposure in one pass using power $P_1$, exposure in one pass using power $P_2$, and exposure in two passes using power $P_1$ and $P_2$.

9. The optical scanning device of claim 6, wherein two times $P_1$ is substantially equal to $P_2$.

10. The optical scanning device of claim 6, wherein $P_1$ plus $P_2$ equals full exposure.

11. The optical scanning device of claim 10, wherein $P_1$ is ⅓ of full exposure and $P_2$ is ⅔ of full exposure.

12. The optical scanning device of claim 8, wherein the number of selective power exposures is equal to 2 to the power of the (number of laser power levels).

13. The optical scanning device of claim 6, wherein said data is a binary representation of pixel values thereby producing spatial regions selected from the group consisting of no exposure in either pass, exposure in one pass using power $P_1$, exposure in one pass using power $P_2$, and exposure in x passes using powers $(P_1, P_2, \ldots, P_x)$.

* * * * *